(12) United States Patent
Barker, Jr. et al.

(10) Patent No.: US 8,788,892 B2
(45) Date of Patent: Jul. 22, 2014

(54) SYSTEM AND METHOD FOR TESTING RADIO FREQUENCY DEVICE UNDER TEST CAPABLE OF COMMUNICATING USING MULTIPLE RADIO ACCESS TECHNOLOGIES

(75) Inventors: William L Barker, Jr., Oak Lawn, IL (US); James Lawrence Banzen, Inverness, IL (US)

(73) Assignee: Litepoint Corporation, Sunnyvale, CA (US)

( * ) Notice: Subject to any disclaimer, the term of this patent is extended or adjusted under 35 U.S.C. 154(b) by 171 days.

(21) Appl. No.: 13/595,556

(22) Filed: Aug. 27, 2012

(65) Prior Publication Data
US 2014/0059397 A1 Feb. 27, 2014

(51) Int. Cl.
| | |
|---|---|
| *G01R 31/28* | (2006.01) |
| *H03M 13/00* | (2006.01) |
| *H04L 12/26* | (2006.01) |
| *H04B 17/00* | (2006.01) |
| *H04W 4/00* | (2009.01) |
| *H04W 36/24* | (2009.01) |
| *H04W 36/36* | (2009.01) |
| *H04W 36/14* | (2009.01) |
| *H04W 48/16* | (2009.01) |
| *H04W 76/02* | (2009.01) |
| *H04W 24/00* | (2009.01) |
| *H04W 24/06* | (2009.01) |
| *H04W 48/18* | (2009.01) |
| *H04W 88/06* | (2009.01) |
| *H04L 12/28* | (2006.01) |
| *H04L 12/54* | (2013.01) |

(52) U.S. Cl.
CPC .............. *H04W 36/24* (2013.01); *H04W 36/36* (2013.01); *H04W 36/14* (2013.01); *H04W 48/16* (2013.01); *H04W 76/025* (2013.01); *H04W 24/00* (2013.01); *H04W 24/06* (2013.01); *H04W 48/18* (2013.01); *H04W 88/06* (2013.01); *H04B 17/008* (2013.01); *H04L 12/2858* (2013.01); *H04L 12/2863* (2013.01); *H04L 12/5692* (2013.01)

USPC ........ 714/712; 714/742; 714/821; 370/395.5; 455/67.11; 455/115.2; 455/434; 455/432.1; 455/435.2

(58) Field of Classification Search
CPC ..... H04W 36/24; H04W 36/36; H04W 36/14; H04W 76/025; H04W 24/00; H04W 24/06; H04W 48/18; H04W 48/16; H04W 88/06; H04B 17/008; H04L 12/2858; H04L 12/2863; H04L 12/5692
USPC ........................ 714/712, 742, 821; 370/395.5; 455/67.11, 115.2, 434, 432.1, 435.2
See application file for complete search history.

(56) References Cited

U.S. PATENT DOCUMENTS 7,750,660 B2 * 7/2010 Varadarajan et al. ..... 324/762.03
8,346,315 B2 * 1/2013 Lindoff et al. ................ 455/574
(Continued)

FOREIGN PATENT DOCUMENTS

| | | | | |
|---|---|---|---|---|
| TW | 2448314 A2 * | 5/2012 | ............ | H04W 24/00 |
| WO | 2009-135866 A1 | 11/2009 | | |
| WO | 2010-019087 A1 | 2/2010 | | |

OTHER PUBLICATIONS

Spirent Communications, Inc., SPIRENT CS8 Wireless Device Design Tester for System Design and Platform Testing, 2011, Spirent Communications, Inc., Rev. A 10/11, pp. 1-8.*

(Continued)

*Primary Examiner* — John J Tabone, Jr.
(74) *Attorney, Agent, or Firm* — Vedder Price, P.C.

(57) ABSTRACT

System and method for testing a radio frequency (RF) device under test (DUT) communicating using multiple radio access technologies (RATs). Single data signal sequences having characteristics of multiple RATs as prescribed by signal standards are exchanged between a tester and DUT. The tester and DUT process received signal sequences substantially in parallel with their reception. A pattern of contemporaneous signal sequence reception and processing continues for as many RATs as the DUT is capable of supporting.

18 Claims, 4 Drawing Sheets

(56) References Cited

U.S. PATENT DOCUMENTS

| | | | |
|---|---|---|---|
| 8,391,861 B2* | 3/2013 | Breuer et al. | 455/434 |
| 8,463,261 B2* | 6/2013 | Nader et al. | 455/434 |
| 8,594,671 B2* | 11/2013 | Wu | 455/436 |
| 8,626,151 B2* | 1/2014 | Beppler et al. | 455/425 |
| 2011/0044218 A1* | 2/2011 | Kaur et al. | 370/310 |
| 2011/0075605 A1* | 3/2011 | De Pasquale et al. | 370/328 |
| 2012/0034917 A1* | 2/2012 | Kazmi | 455/434 |
| 2012/0108241 A1 | 5/2012 | Wu | |
| 2013/0072182 A1* | 3/2013 | Jung et al. | 455/422.1 |
| 2013/0090113 A1* | 4/2013 | Persson et al. | 455/424 |
| 2013/0176884 A1* | 7/2013 | Chang | 370/252 |
| 2013/0189991 A1* | 7/2013 | Rose et al. | 455/436 |
| 2013/0197850 A1* | 8/2013 | Yu et al. | 702/117 |
| 2013/0244584 A1* | 9/2013 | Mattison et al. | 455/67.14 |
| 2013/0286860 A1* | 10/2013 | Dorenbosch et al. | 370/252 |
| 2013/0303098 A1* | 11/2013 | Carlsson et al. | 455/226.1 |

OTHER PUBLICATIONS

U.S. Appl. 13/488,742, filed Jun. 5, 2012, "System and Method for Execution of User-Defined Instrument Command Sequences Using Multiple Hardware and Analysis Modules"; 26 Pages.

International Search Report and Written Opinion Dated Aug. 27, 2013 for Application No. PCT/US2013/043850.

* cited by examiner

SYSTEM AND METHOD FOR TESTING RADIO FREQUENCY DEVICE UNDER TEST CAPABLE OF COMMUNICATING USING MULTIPLE RADIO ACCESS TECHNOLOGIES

BACKGROUND

The present invention relates to testing radio frequency communication devices, such as wireless packet data transceivers, and in particular, to such devices that employ multiple radio acquisition technologies (RATs), such as "smartphones" and tablet computers, among others.

Today's more advanced wireless devices often include means (e.g., hardware, firmware and/or software components as appropriate) for uploading and downloading data via broadband cellular networks, and will typically need to use at least two different radio access technologies that permit such devices to connect with whatever cellular radio access technology is within range and available. For example, a device designed to provide internet access via a third generation (3G) RAT will also be capable of accessing a second generation (2G) RAT if a 3G RAT cellular network is unavailable or out of range. Newer devices designed for fourth generation (4G) RAT access may have two or more additional RATs that allow it to refer to 3G or 2G RAT as necessary, depending upon range and availability. By having these additional resources, i.e., capabilities of accessing multiple RATs, such devices ensure that users will be able to access cellular networks from more locations and with the fastest service possible.

Such devices having multiple RAT capabilities must be tested accordingly to ensure that all such RATs can be tested and verified as meeting the operational specifications prescribed for its corresponding signal standard, and has not been subject to design or manufacturing defects that render its operation out of such prescribed limits.

When such devices and their RATs are calibrated and tested, it is typically done in a sequential fashion. In other words, a test system is set up to calibrate one specific RAT for the device and to verify that the device operation using such RAT meets the prescribed standard specifications. The device is then prompted to transmit one or more signals, which are used to calibrate and verify that this particular RAT, as exercised in this device under test (DUT), operates in accordance with the prescribed standard specifications. Following that first calibration and/or verification test, the tester is then set up to do a similar calibration and verification by having the DUT operate using another RAT. As before, the DUT is prompted to send signals to the tester in accordance with this other RAT standard specification. If the DUT is capable of operating in accordance with more than two RATs, then, following the second calibration and test, a third calibration and test operation is set up by the tester and the DUT is once again prompted to send one or more signals in accordance with this third RAT. This process is repeated for all RATs of which the DUT is capable of using.

Such calibration and verification processes take a finite amount of time for each RAT. Additionally, time to set up the tester following each test or set of tests for the next test or set of tests, and time necessary to prompt the DUT to send the appropriate signals in accordance with the RAT to be tested all add potentially significant amounts of time to the setup and test duration, as well as multiple test command and control sequences. Accordingly, as devices become capable of operating in accordance with more RATs, the time and, therefore, cost, of testing such devices rises as well.

SUMMARY

A system and method are provided for testing a radio frequency (RF) device under test (DUT) communicating using multiple radio access technologies (RATs). Single data signal sequences having characteristics of multiple RATs as prescribed by signal standards are exchanged between a tester and DUT. The tester and DUT process received signal sequences substantially in parallel with their reception. A pattern of contemporaneous signal sequence reception and processing continues for as many RATs as the DUT is capable of supporting.

In accordance with an exemplary embodiment, a single signal sequence is communicated between a tester and a DUT, e.g., emitted from the DUT and received by the tester and/or emitted by the tester and received by the DUT, which incorporates physical signal manifestations prescribed by the standard for each RAT and used in the calibration and verification testing process of the DUT.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

Figure 1:
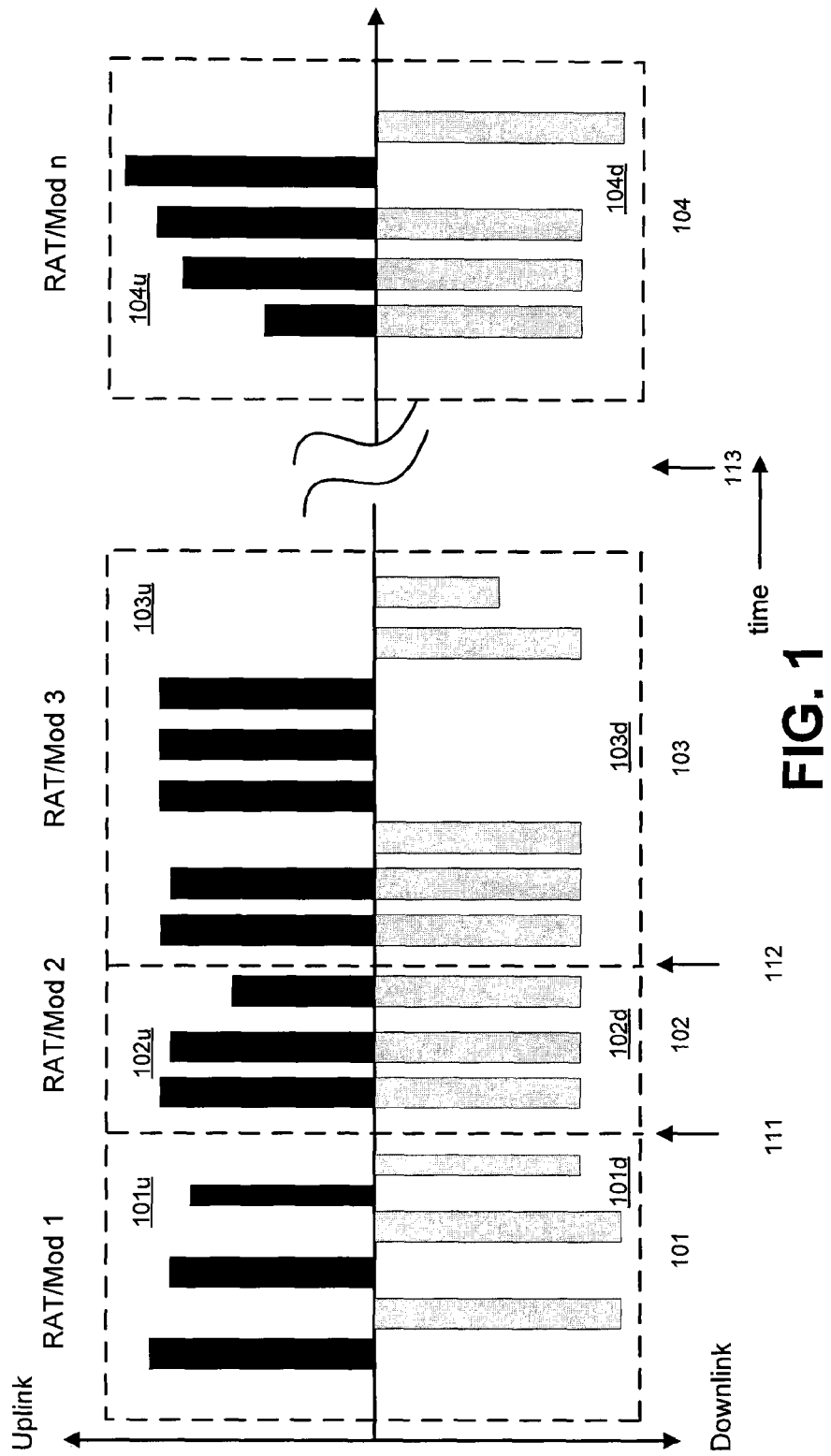
FIG. 1 depicts a sequence of signals communicated between a tester and a DUT in accordance with multiple RATs.

Referring to FIG. 1, conventional testing of a DUT capable of operating in accordance with multiple RATs proceeds sequentially. For example, the tester is first set up to calibrate and test signals during a first signal sequence 101 based on a first technology RAT/Mod 1. Uplink signals 101$u$ are transmitted from the DUT to the tester and downlink signals 101$d$ are transmitted from the tester to the DUT. In this example signal sequence 101, the uplink 101$u$ and downlink 101$d$ signals occur sequentially. Second, the tester is set up for second technology RAT/Mod 2 during a second signal sequence 102. In this example as shown, the uplink 102$u$ and downlink 102$d$ signals occur simultaneously, i.e., full duplex. Next, the tester is set up for a third technology RAT/Mod3 during a third signal sequence 103. In this example, the uplink 103$u$ and downlink 103$d$ signals are variously communicated between the tester and DUT simultaneously (full duplex) and sequentially (half duplex). This process is continued for the n technologies supported by the DUT.

As will be readily appreciated, while these signal sequences 101, 102, 103, 104 appear to be concatenated, i.e., each subsequent sequence immediately following the previous sequence, there must be finite time intervals 111, 112, 113 between immediately previous and subsequent signal sequences 101, 102, 103, 104. These are necessary for tester setup, and command and control interactions between the tester and DUT, as well as other time intervals necessary for other setup and control functions.

Figure 2:
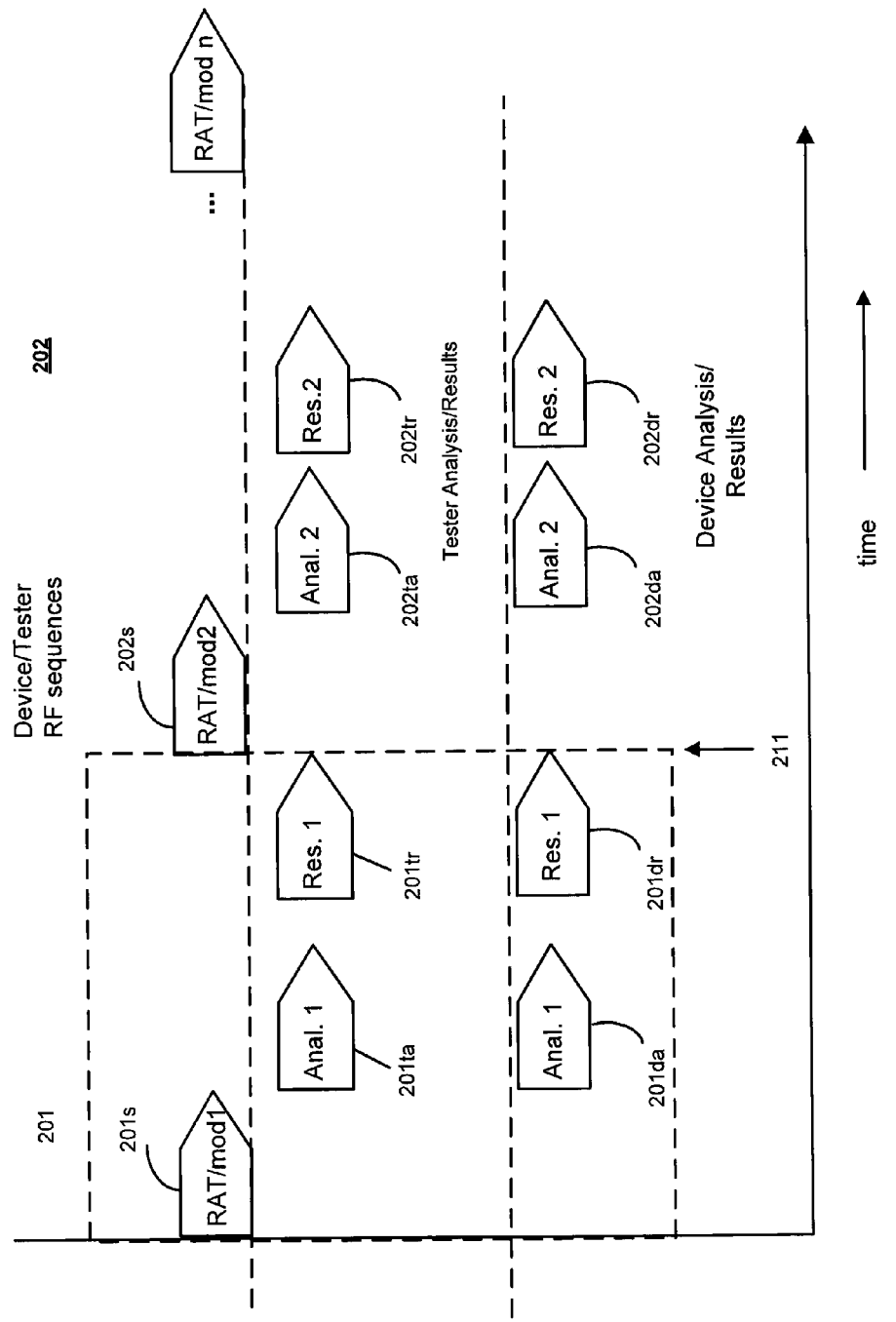
FIG. 2 depicts the sequence of signals of FIG. 1 with more detail about time intervals necessary for signal transmission, analysis and testing.

Referring to FIG. 2, the time requirements for such conventional testing can be better understood. During a first time interval 201, the uplink and/or downlink signals 201$s$ are communicated in accordance with a first technology RAT/Mod 1. Following reception of these signals 201$s$, the tester processes its received signal by analyzing 201$ta$, the received signal and checking the analysis results 201$tr$ (e.g., confirming operation according to the prescribed standard specification). Similarly, the DUT analyzes 201$da$ its received signal and checks the results 201$dr$ of that analysis. During the next time interval 202, a second signal sequence 202$s$ is communicated and this analysis and results checking process is repeated. As noted above, additional time 211 is needed between these signal sequences 201$s$, 202$s$ to set up the tester and allow any necessary communications between the tester and the DUT, as well as an outside controller as needed. (This example presumes full duplex operation in which analysis and testing by the tester and DUT are performed contemporaneously. If the operation were half duplex instead, even more time would be required to complete testing of the DUT.)

Figure 3:
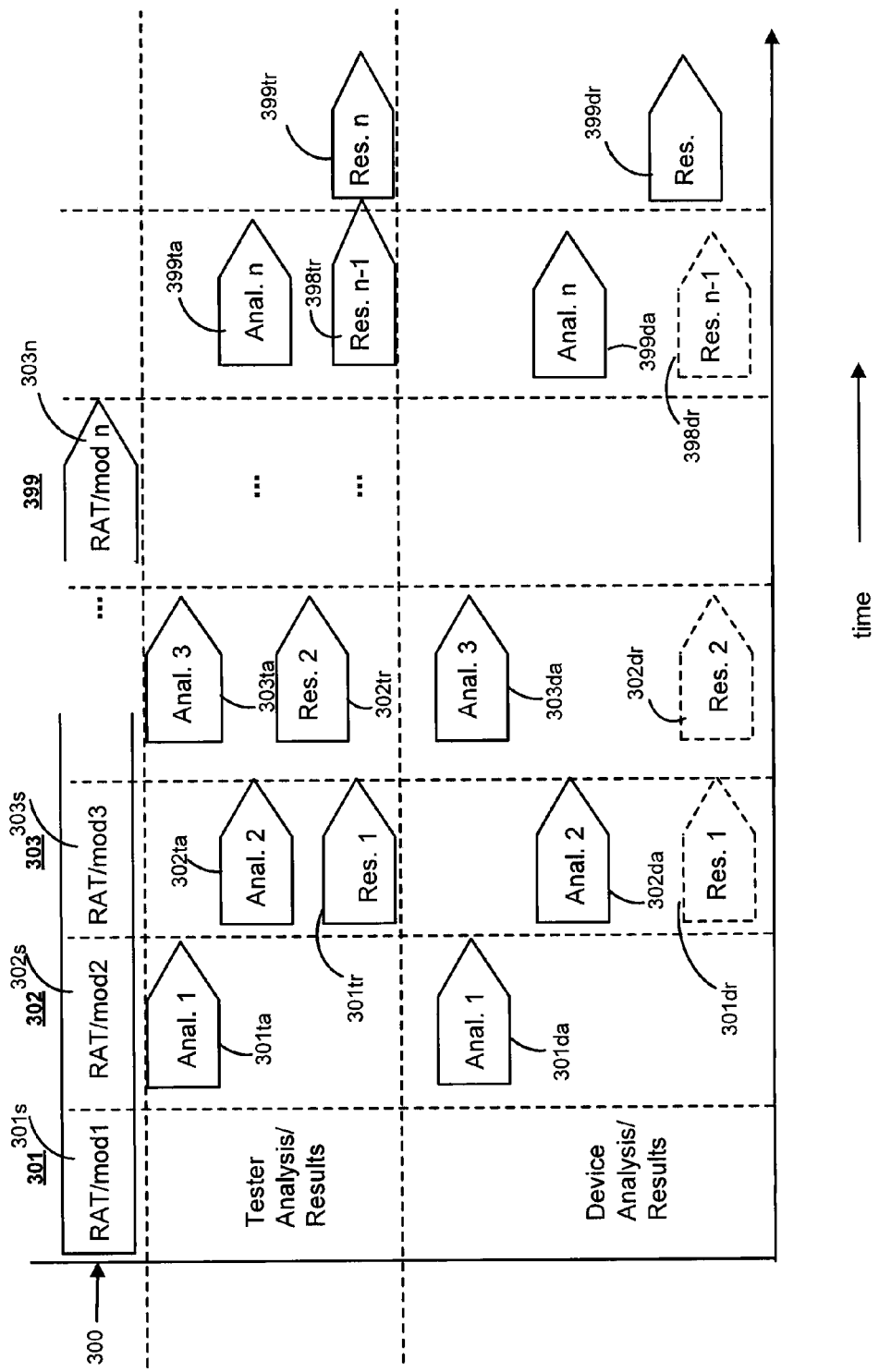
FIG. 3 depicts time intervals in accordance with one embodiment of the presently claimed invention during which a signal sequence containing signal transmissions in accordance with multiple RATs is received, analyzed and tested by a tester or a DUT, or both.

Referring to FIG. 3, in accordance with an exemplary embodiment of the presently claimed invention, the signal or signals to be communicated between the tester and DUT are assembled into a single respective signal sequences 300 over successive time intervals 301, 302, 303, ..., 399 during which the signal sequences 300 are communicated in accordance with respective radio acquisition technologies RAT/Mod 1 301$s$, RAT/Mod 2 302$s$, RAT/Mod 3 303$s$, ..., RAT/Mod n 303$n$. During the first time interval 301, the signal 300 is communicated in accordance with a first RAT 301$s$. During the second time interval 302, the signal 300 is communicated in accordance with a second RAT 302$s$. Also during this second time interval 302, the signal as received by the tester is analyzed 301$ta$, and the signal received by the DUT is analyzed 301$da$. During the third time interval 303, the signal 300 is communicated in accordance with a third RAT 303$s$. During this time interval 303, the results of the first tester analysis 301$ta$ are tested 301$tr$ against the standard specification for the first RAT 301$s$, and the signal portion 302$s$ received during the second time interval 302 is analyzed 302$ta$. Similarly, during this time interval 303, the DUT analyzes 302$da$ its signal portion received in accordance with the second RAT 302$s$.

This process continues for all n signal portions forming the single signal sequence 300 in which the signal 300 is communicated in accordance with the n RATs 301$s$, 302$s$, 303$s$, ..., 303$n$. Following completion of this signal sequence 300, the tester completes its final received signal analysis 399$ta$ and next-to-last results testing 398$tr$, followed by its final results testing 399$tr$, as discussed above. Similarly, the final received signal analysis 399$da$ is completed by the DUT. In accordance with one embodiment, due to the less complex testing required on the part of the DUT, the results testing 399$dr$ performed by the DUT on the previous received signal portion analysis 301$da$, 302$da$, 303$da$, ..., 399$da$ can be performed last. Alternatively, if desired, or if necessary due to more complex signal specifications or testing requirements, respective results testing 301$dr$, 302$dr$, ..., 398$dr$ can be performed during respective time intervals following the corresponding signal portion analyses 301$da$, 302$da$.

As will be readily appreciated, in contrast to conventional testing techniques, a system and method in accordance with the presently claimed invention supports test time compression by eliminating frequent tester set-up and command sequences between the tester and the DUT, and by having the tester and DUT perform their respective analyses substantially concurrently with the single signal sequence of uplink and downlink signals having the signal characteristics needed for calibration, testing and verification of the respective signal portions communicated in accordance with the various RATs. This is achieved, at least in part, by having the tester and/or DUT perform their respective signal processing sequences (e.g., signal analyses and results testing) on previously received portions of the signal sequence during subsequent receptions of subsequent signal sequence portions. For example, the first analysis is performed during a time interval immediately following the time interval in which the uplink and/or downlink signal was received and captured, while during the next time interval, the results testing of that analysis is performed in parallel with the next analysis as the single signal sequence continues.

Figure 4:
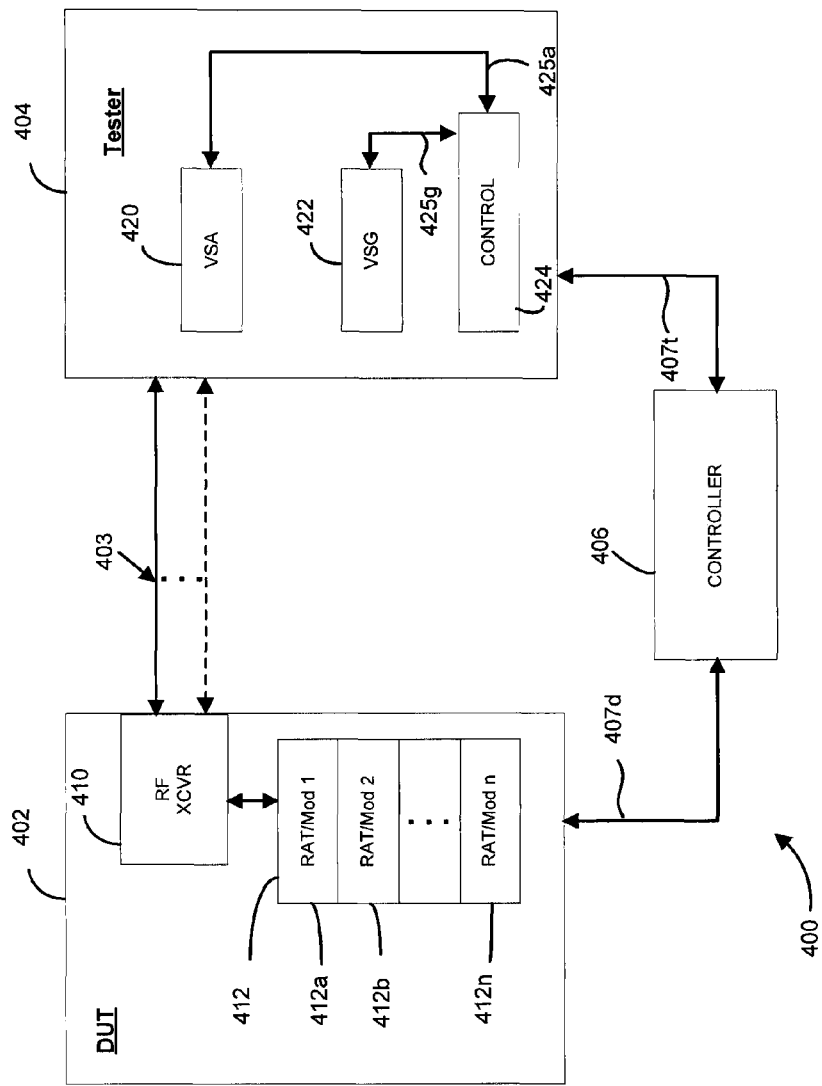
FIG. 4 depicts a test equipment environment for performing testing of a DUT as depicted in FIG. 3.

Referring to FIG. 4, a testing environment 400 for testing a DUT 402 with a tester 404 can be implemented as shown. A DUT 402 and tester 404 communicate via one or more radio frequency (RF) signals 403. Also included, depending upon the degree of autonomy on the part of the tester 404 and DUT 402 in terms of their respective operations during testing, an external controller 406 can be provided for communicating commands and data 407$d$, 407$t$ between it and the DUT 402 and tester 404.

The tester 404 includes a vector signal analyzer (VSA) 420, a vector signal generator (VSG) 422 and an internal controller or processor 424 which provides commands and data to and receives data from the VSA 420 and VSG 422 via data and control signal paths 425$a$, 425$g$. In accordance with commands and control data from the controller 424 (which will also include some amount of associated memory, e.g., local or remotely accessible, for commands and data), the VSG 422 transmits and the VSA 420 receives the signal sequence 300 (FIG. 3) to and from the DUT, respectively, during testing in accordance with the presently claimed invention.

The DUT 402 includes a RF transceiver 410 and one or more modules 412 providing or containing commands and data 412a, 412b, . . . , 412n for the respective RATs in accordance with which the DUT 402 will be transmitting and receiving signal sequences 300 (FIG. 3). These modules 412a, 412b, . . . , 412n can be implemented in accordance with well known techniques using hardware, firmware and/or software, as desired, for operating in cooperation with the RF transceiver 410 to transmit and receive the signal sequences 300, as well as perform the received signal analyses and results testing, as discussed above (FIG. 3). Further, firmware and/or software implementations can include one or more commands in accordance with which a file can be loaded into the DUT 402 prior to testing, or, during a DUT boot sequence, default calibration information can be detected within the DUT 402 that enables a firmware or hardware based mode in accordance with which the DUT 402 is prepared and ready to run a test sequence following reception of a trigger signal or command. Such a trigger signal or command may be provided internally within the DUT 402 (e.g., a command from an internal controller or processor) or externally via a signal 403 from the tester 404 or a command 407d from the controller 406.

Similarly, the tester 404 can also be controlled by firmware or software, e.g., within the internal controller 424, to operate in coordination and cooperation with a predefined signal sequence from the DUT 402 so as to support half or full duplex emissions of a single sequence of uplink and downlink signals.

As discussed above, in accordance with the presently claimed invention, a DUT and tester operate in coordination and cooperation to produce a single signal sequence whose signal characteristics can be used for calibration by supporting various signal analyses and tests, including: automatic frequency control (AFC) lock within a first frequency band, transmit signal power sweeping at mid-channel, transmit signal discrete frequency sweep channel measurements, transmit signal I/Q alignment, receive signal power sweep at mid-channel, receive signal discrete frequency sweep channel measurements. With regard to verification, the device and tester operate in coordination and cooperation to produce a single signal sequence whose signal characteristics can be used for verification by supporting further signal analyses and testing, including: transmit signal power at mid-channel at multiple power levels, transmit signal discrete frequency sweep channel measurement, transmit signal frequency error on each tested channel, transmit signal peak/RMS and phase/EVM error on each tested channel, transmit signal spectral measurements on each channel, receive signal strength indication (RSSI) at mid-channel, RSSI discrete frequency sweep channel measurements, and single-ended bit error rate for one channel per band.

One example of a tester architecture suitable for operating in accordance with embodiments of the presently claimed invention is described in U.S. patent application Ser. No. 13/488,742, filed Jun. 5, 2012, and entitled "SYSTEM AND METHOD FOR EXECUTION OF USER-DEFINED INSTRUMENT COMMAND SEQUENCES USING MULTIPLE HARDWARE AND ANALYSIS MODULES," the disclosure of which is incorporated herein by reference.

For purposes of the presently claimed invention, examples of the radio access technologies include, among others: "3GPP Long Term Evolution," referred to as "LTE" and marketed as "4G LTE," for a standard for wireless communication of high-speed data for electronic devices including, mobile phones and data terminals; Global System for Mobile Communications (GSM), originally Groupe Spécial Mobile; GSM/Enhanced Data rates for GSM Evolution (EDGE); Universal Mobile Telecommunications System (UMTS)/High Speed Packet Access (HSPA) network technologies. The LTE standard was developed by the 3GPP (3rd Generation Partnership Project) and specified in its Release 8 document series, with minor enhancements described in Release 9. The GSM standard was developed by the European Telecommunications Standards Institute (ETSI) to describe technologies for second-generation (2G) digital cellular networks. The EDGE standard (also known as Enhanced GPRS (EGPRS), or IMT Single Carrier (IMT-SC), or Enhanced Data rates for Global Evolution) is a digital mobile-phone technology that allows improved data transmission rates as a backward-compatible extension of GSM. The Universal Mobile Telecommunications System (UMTS) is a third-generation mobile cellular technology for networks based on the GSM standard. Developed by the 3GPP (3rd Generation Partnership Project), UMTS is a component of the International Telecommunications Union IMT-2000 standard set and compares with the CDMA2000 standard set for networks based on the competing cdmaOne technology. The UMTS employs Wideband Code Division Multiple Access (WCDMA) radio access technology to offer greater spectral efficiency and bandwidth to mobile network operators. The UMTS specifies a complete network system, covering the radio-access network (UMTS Terrestrial Radio Access Network, or UTRAN), the core network (Mobile Application Part, or MAP) and the authentication of users via SIM cards (Subscriber Identity Module). High Speed Packet Access (HSPA) is an amalgamation of two mobile telephony protocols, High Speed Downlink Packet Access (HSDPA) and High Speed Uplink Packet Access (HSUPA), that extends and improves the performance of existing WCDMA protocols.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing a radio frequency (RF) device under test (DUT) capable of communicating using a plurality of radio access technologies (RATs), comprising:
   receiving, with a DUT from a tester during a plurality of successive time intervals, one or more RF data signals having a plurality of mutually distinct signal characteristics in accordance with a plurality of RATs, wherein, during first and second adjacent ones of said plurality of successive time intervals, said one or more RF data signals have at least first and second mutually distinct signal characteristics in accordance with first and second ones of said plurality of RATs, respectively; and
   processing, with said DUT, said received one or more RF data signals during a portion of said plurality of successive time intervals subsequent to said first one of said plurality of successive time intervals.

2. The method of claim 1, wherein said receiving, with a DUT from a tester during a plurality of successive time intervals, one or more RF data signals having a plurality of mutually distinct signal characteristics in accordance with a plurality of RATs comprises capturing at least a portion of a plurality of data from said one or more RF data signals.

3. The method of claim 1, wherein said processing, with said DUT, said received one or more RF data signals during a portion of said plurality of successive time intervals subsequent to said first one of said plurality of successive time intervals comprises:
  analyzing at least a portion of said one or more RF data signals to provide a plurality of analysis data; and
  comparing said plurality of analysis data to a plurality of predetermined results data.

4. The method of claim 1, wherein said processing, with said DUT, said received one or more RF data signals during a portion of said plurality of successive time intervals subsequent to said first one of said plurality of successive time intervals comprises processing, with said DUT, said received one or more RF data signals during respective adjacent ones of said plurality of successive time intervals subsequent to said first one of said plurality of successive time intervals.

5. The method of claim 1, further comprising transmitting, with said DUT during at least another portion of said plurality of successive time intervals, another one or more RF data signals having another plurality of mutually distinct signal characteristics in accordance with said plurality of RATs, wherein, during third and fourth adjacent ones of said plurality of successive time intervals, said another one or more RF data signals have at least third and fourth mutually distinct signal characteristics in accordance with respective ones of said plurality of RATs.

6. A method of testing a radio frequency (RF) device under test (DUT) capable of communicating using a plurality of radio access technologies (RATs), comprising:
  receiving, with a tester from a DUT during a plurality of successive time intervals, one or more RF data signals having a plurality of mutually distinct signal characteristics in accordance with a plurality of RATs, wherein, during first and second adjacent ones of said plurality of successive time intervals, said one or more RF data signals have at least first and second mutually distinct signal characteristics in accordance with first and second ones of said plurality of RATs, respectively; and
  processing, with said tester, said received one or more RF data signals during a portion of said plurality of successive time intervals subsequent to said first one of said plurality of successive time intervals.

7. The method of claim 6, wherein said receiving, with a tester from a DUT during a plurality of successive time intervals, one or more RF data signals having a plurality of mutually distinct signal characteristics in accordance with a plurality of RATs comprises capturing at least a portion of a plurality of data from said one or more RF data signals.

8. The method of claim 6, wherein said processing, with said tester, said received one or more RF data signals during a portion of said plurality of successive time intervals subsequent to said first one of said plurality of successive time intervals comprises:
  analyzing at least a portion of said one or more RF data signals to provide a plurality of analysis data; and
  comparing said plurality of analysis data to a plurality of predetermined results data.

9. The method of claim 6, wherein said processing, with said tester, said received one or more RF data signals during a portion of said plurality of successive time intervals subsequent to said first one of said plurality of successive time intervals comprises processing, with said tester, said received one or more RF data signals during respective adjacent ones of said plurality of successive time intervals subsequent to said first one of said plurality of successive time intervals.

10. The method of claim 6, further comprising transmitting, with said tester during at least another portion of said plurality of successive time intervals, another one or more RF data signals having another plurality of mutually distinct signal characteristics in accordance with said plurality of RATs, wherein, during third and fourth adjacent ones of said plurality of successive time intervals, said another one or more RF data signals have at least third and fourth mutually distinct signal characteristics in accordance with respective ones of said plurality of RATs.

11. A method of testing a radio frequency (RF) device under test (DUT) capable of communicating using a plurality of radio access technologies (RATs), comprising:
  receiving, with a DUT from a tester during at least a portion of a plurality of successive time intervals, one or more RF tester signals having a plurality of mutually distinct signal characteristics in accordance with a plurality of RATs, wherein, during first and second adjacent ones of said plurality of successive time intervals, said one or more RF tester signals have at least first and second mutually distinct signal characteristics in accordance with first and second ones of said plurality of RATs, respectively;
  processing, with said DUT, said received one or more RF tester signals during a portion of said plurality of successive time intervals subsequent to said first one of said plurality of successive time intervals;
  receiving, with said tester from said DUT during at least a portion of said plurality of successive time intervals, one or more RF DUT signals having a plurality of mutually distinct signal characteristics in accordance with said plurality of RATs, wherein, during third and fourth adjacent ones of said plurality of successive time intervals, said one or more RF DUT signals have at least third and fourth mutually distinct signal characteristics in accordance with third and fourth ones of said plurality of RATs, respectively; and
  processing, with said tester, said received one or more RF DUT signals during a portion of said plurality of successive time intervals subsequent to said third one of said plurality of successive time intervals.

12. The method of claim 11, wherein said third and fourth adjacent ones of said plurality of successive time intervals are coincident with said first and second adjacent ones of said plurality of successive time intervals, respectively.

13. The method of claim 11, wherein said receiving, with a DUT from a tester during at least a portion of a plurality of successive time intervals, one or more RF tester signals having a plurality of mutually distinct signal characteristics in accordance with a plurality of RATs comprises capturing at least a portion of a plurality of data from said one or more RF tester signals.

14. The method of claim 11, wherein said processing, with said DUT, said received one or more RF tester signals during a portion of said plurality of successive time intervals subsequent to said first one of said plurality of successive time intervals comprises:
  analyzing at least a portion of said one or more RF tester signals to provide a plurality of analysis data; and
  comparing said plurality of analysis data to a plurality of predetermined results data.

15. The method of claim 11, wherein said processing, with said DUT, said received one or more RF tester signals during a portion of said plurality of successive time intervals subsequent to said first one of said plurality of successive time intervals comprises processing, with said DUT, said received one or more RF tester signals during respective adjacent ones of said plurality of successive time intervals subsequent to said first one of said plurality of successive time intervals.

16. The method of claim 11, wherein said receiving, with said tester from said DUT during at least a portion of said plurality of successive time intervals, one or more RF DUT signals having a plurality of mutually distinct signal characteristics in accordance with said plurality of RATs comprises capturing at least a portion of a plurality of data from said one or more RF DUT signals.

17. The method of claim 11, wherein said processing, with said tester, said received one or more RF DUT signals during a portion of said plurality of successive time intervals subsequent to said third one of said plurality of successive time intervals comprises:
- analyzing at least a portion of said one or more RF DUT signals to provide a plurality of analysis data; and
- comparing said plurality of analysis data to a plurality of predetermined results data.

18. The method of claim 11, wherein said processing, with said tester, said received one or more RF DUT signals during a portion of said plurality of successive time intervals subsequent to said third one of said plurality of successive time intervals comprises processing, with said tester, said received one or more RF DUT signals during respective adjacent ones of said plurality of successive time intervals subsequent to said third one of said plurality of successive time intervals.

\* \* \* \* \*